C. L. PEIRCE, Jr.
INSULATOR SUPPORT.
APPLICATION FILED FEB. 5, 1916.

1,210,685.

Patented Jan. 2, 1917.

*INVENTOR.*
Charles L. Peirce Jr.
BY James R. Offield
ATTORNEYS.

UNITED STATES PATENT OFFICE.

CHARLES L. PEIRCE, JR., OF PITTSBURGH, PENNSYLVANIA, ASSIGNOR OF ONE-HALF TO HUBBARD & CO., OF PITTSBURGH, PENNSYLVANIA, A CORPORATION OF PENNSYLVANIA.

INSULATOR-SUPPORT.

1,210,685.

Specification of Letters Patent. Patented Jan. 2, 1917.

Application filed February 5, 1916. Serial No. 76,303.

*To all whom it may concern:*

Be it known that I, CHARLES L. PEIRCE, Jr., a citizen of the United States, and a resident of Pittsburgh, in the county of Allegheny and State of Pennsylvania, have invented certain new and useful Improvements in Insulator-Supports, of which the following is a specification.

My invention relates to insulator supports and involves improved construction and arrangement which is stronger, more practical and more efficient.

Wooden insulator supporting pins have been used for a long time, and so far as resilient seating of the insulator is concerned, such pins are very efficient, wood being quite resilient and yielding. However, the greater part of wooden pins is open to the weather and the pins will crack and rot and soon become weakened or will break. Even when the wooden pins are new and sound they do not possess sufficient strength in the body to withstand strains during service.

The main object of my invention is to produce an insulator support comprising a bracket part of sheet metal to give supporting strength, and a wooden thimble for providing a resilient seat for insulators. The bracket part of my improved insulator support is bent up from a single piece of sheet metal preferably to arch-shaped cross-section throughout the body part, but formed at its end to be of close circular cross-section to provide a cylindrical socket for receiving the cylindrical lug of the wooden thimble.

A structure embodying the features of my invention is shown on the accompanying drawing in which—

Figure 1:
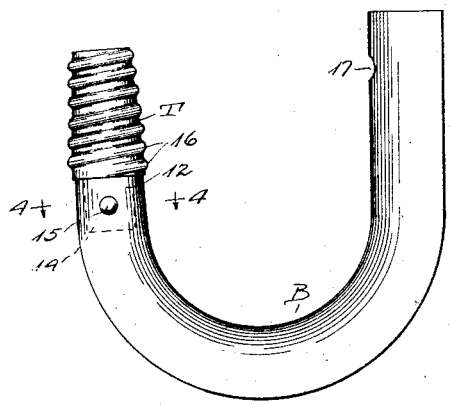
Figure 2:
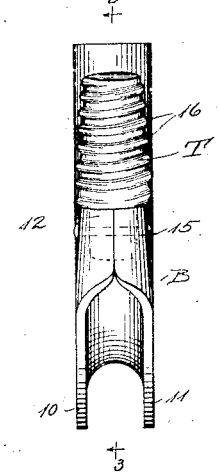
Figure 3:
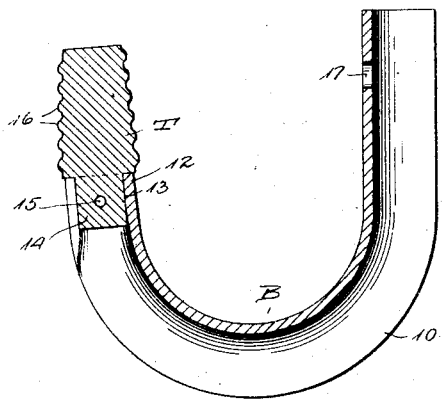
Figure 4:
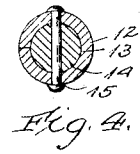

Figure 1 is a side elevational view, Fig. 2 is a front view, Fig. 3 is a sectional view on plane 3—3, Fig. 2, and Fig. 4 is a sectional view on plane 4—4, Fig. 1.

The insulator support shown has the U-shaped bracket part B and the insulator receiving thimble or head T. The bracket part is bent up from a single piece of sheet metal to arch or U-shaped cross-section, the limbs 10 and 11 being parallel or at angles with each other throughout the body of the bracket member but brought together at the end to form the cylindrical section 12 which surrounds the cylindrical socket 13. The thimble T is of circular cross-section throughout and abuts against the bracket end, and has the cylindrical lug 14 for fitting into the socket 13, a rivet 15 being shown for securing the thimble to the bracket. The thimble has suitable threads 16 for receiving an insulator. The bracket part of the support shown is of maximum strength for a minimum amount of metal, and the wooden thimble gives a resilient seat for the insulator. The bracket member may be provided with any means for securing it to a wall, pole or other support, a bolt hole 17 being shown. Not only does the circular end of the bracket member afford a secure seat for the thimble, but by intimately surrounding the thimble lug it prevents splitting.

I do not desire to be limited to the precise construction and arrangement shown as changes and modifications are no doubt possible which would still come within the scope of the invention.

I claim as follows:

1. An insulator support consisting of a bracket member and an insulator receiving pin, said bracket member being formed up from a single band of sheet metal bent longitudinally and brought together at one end to form a circular clamping socket, said pin fitting at its lower end in said socket.

2. An insulator support consisting of a bracket member and an insulator receiving pin, said bracket member being formed from a single band of sheet metal bent longitudinally and brought together at one end to form a cylindrical clamping socket, said pin having a reduced lower end and a shoulder for fitting into said socket and abutting against the end of the socket respectively.

3. An insulator support consisting of a bracket member and an insulator receiving pin, said bracket member being formed from a single band of sheet metal bent longitudinally to arch section and the sides at one end brought together to form a cylindrical clamping socket, said pin being of wood and having a reduced cylindrical lower end and a shoulder for fitting respectively into said socket and abutting against the socket end, and a rivet extending through said socket to clamp the sides thereof against said pin end.

In witness whereof I hereunto subscribe my name this 1st day of February, A. D. 1916.

CHARLES L. PEIRCE, Jr.